US010220931B2

(12) United States Patent
Perkins et al.

(10) Patent No.: US 10,220,931 B2
(45) Date of Patent: Mar. 5, 2019

(54) SIDEWALL PANEL ASSEMBLY AND RETURN AIR BRIDGE FOR USE IN AN AIRCRAFT ASSEMBLY

(71) Applicant: THE BOEING COMPANY, Huntington Beach, CA (US)

(72) Inventors: Thomas Seth Perkins, Renton, WA (US); Cory Michael Hitchcock, Granite Falls, WA (US); John Erik West, Seattle, WA (US); Adam R. Weston, Brier, WA (US); Gregory A. Tubbs, Marysville, WA (US)

(73) Assignee: The Boeing Company, Chicago, IL (US)

( * ) Notice: Subject to any disclaimer, the term of this patent is extended or adjusted under 35 U.S.C. 154(b) by 285 days.

(21) Appl. No.: 14/935,788

(22) Filed: Nov. 9, 2015

(65) Prior Publication Data
US 2017/0129581 A1 May 11, 2017

(51) Int. Cl.
B64C 1/06 (2006.01)
B64C 1/40 (2006.01)
B64C 1/00 (2006.01)

(52) U.S. Cl.
CPC ............... B64C 1/066 (2013.01); B64C 1/40 (2013.01); B64C 2001/009 (2013.01)

(58) Field of Classification Search
CPC ....... B64C 2001/009; B64C 1/18; B64C 1/40; B64C 1/066
See application file for complete search history.

(56) References Cited

U.S. PATENT DOCUMENTS

| 2,912,724 | A | * | 11/1959 | Wilkes | B64C 1/066 181/207 |
| 4,383,666 | A | * | 5/1983 | Allerding | B64C 1/18 244/118.5 |
| 4,739,955 | A | * | 4/1988 | Aquino | B64C 1/403 160/88 |
| 4,799,631 | A | * | 1/1989 | Humphries | B64D 11/00 105/337 |
| 5,118,053 | A | | 6/1992 | Singh et al. | |
| 6,129,312 | A | * | 10/2000 | Weber | B64C 1/18 244/118.5 |
| 6,264,141 | B1 | | 6/2001 | Shim et al. | |

(Continued)

OTHER PUBLICATIONS

Dictionary.com, "flange"; https://www.dictionary.com/browse/flange, accessed Oct. 23, 2018 (Year: 2018).*

Primary Examiner — Tien Q Dinh
Assistant Examiner — Alexander V. Giczy
(74) Attorney, Agent, or Firm — Armstrong Teasdale LLP

(57) ABSTRACT

A return air bridge for use in an aircraft assembly includes an inboard portion configured to couple to a sidewall assembly at a bottom edge of the sidewall assembly and an outboard portion configured to couple to a structural member. The return air bridge also includes at least one support coupling the inboard portion to the outboard portion such that a return air flow path is defined between the inboard portion and the outboard portion. The outboard portion comprises a plate configured to direct an air flow along the return air flow path upwardly with respect to the bottom edge of the sidewall assembly.

20 Claims, 6 Drawing Sheets

(56) References Cited

U.S. PATENT DOCUMENTS

| | | | |
|---|---|---|---|
| 8,201,775 B2* | 6/2012 | Treimer | B64C 1/18 165/235 |
| 8,393,577 B2 | 3/2013 | Roth et al. | |
| 8,567,721 B2 | 10/2013 | Voss et al. | |
| 8,955,803 B2 | 2/2015 | Voss et al. | |
| 2003/0168553 A1* | 9/2003 | Diehl | B64C 1/18 244/129.1 |
| 2009/0189018 A1* | 7/2009 | Dittmar | B64C 1/066 244/121 |
| 2010/0320318 A1* | 12/2010 | Roth | B64C 1/066 244/118.5 |
| 2011/0284689 A1* | 11/2011 | Thomas | B64C 1/066 244/1 N |
| 2013/0213729 A1* | 8/2013 | Kowal | B64C 1/40 181/175 |
| 2014/0079905 A1* | 3/2014 | Frankenberger | B64C 1/066 428/131 |

* cited by examiner

SIDEWALL PANEL ASSEMBLY AND RETURN AIR BRIDGE FOR USE IN AN AIRCRAFT ASSEMBLY

BACKGROUND

The field of the present disclosure relates generally to aircraft assemblies and, more specifically, to sidewall panel assemblies for use in aircraft assemblies.

During a pressure change on an aircraft (such as a decompression event), air may flow from a passenger cabin to a cargo bay below the cabin through a cabin sidewall. Accordingly, the cabin sidewalls include decompression panels or decompression grilles. Known decompression panels are solid panels and move to create an opening in the sidewall. At least some known decompression panels swing into the space between the sidewall and fuselage skin during a decompression event. However, during normal use, air cannot flow through the decompression panel. Accordingly, a separate return air opening may be provided above or below the decompression panel, for example, by leaving openings in the panel frame and a gap in the sidewall. Such openings and gaps can allow sound waves to propagate from the space between the fuselage and the sidewall into the cabin. Further, such configurations may generate additional noise when air flows past the structures. Additionally, to gain more cabin volume, the sidewalls may be positioned closer to the fuselage skin. In such a situation, the decompression panels do not have enough of a gap to swing open (e.g., the panel will hit the fuselage skin or other structure behind the sidewall during a decompression event).

Other known decompression grilles include an opening having louvers or have several openings through the grille. These openings allow air to flow through the grille during a decompression event so the grille does not move during the decompression event. A baffle is coupled to the backside of the grille opening(s) to limit the amount of return air flow and to decrease the noise in the cabin and can release from the grille during a decompression event. However, to allow for sufficient air return flow (as defined by regulations) through the sidewall, a portion of the opening is not covered by the baffle. Accordingly, sound waves can propagate through the grille at the uncovered portion and/or the louvers may generate sound as air flows past the louvers.

BRIEF DESCRIPTION

In one aspect, a return air bridge for use in an aircraft assembly is provided. The return air bridge includes an inboard portion configured to couple to a sidewall assembly at a bottom edge of the sidewall assembly and an outboard portion configured to couple to a structural member. The return air bridge also includes at least one support coupling the inboard portion to the outboard portion such that a return air flow path is defined between the inboard portion and the outboard portion. The outboard portion comprises a plate configured to direct an air flow along the return air flow path upwardly with respect to the bottom edge of the sidewall assembly.

In another aspect, an aircraft assembly is provided. The aircraft assembly includes a floor panel, a sidewall assembly comprising a bottom edge, and a return air bridge. The return air bridge includes an inboard portion coupled to the bottom edge of the sidewall assembly and an outboard portion coupled to the floor panel. The return air bridge also includes at least one support coupling the inboard portion to the outboard portion such that a return air flow path is defined between the inboard portion and the outboard portion. The outboard portion comprises a plate configured to direct an air flow along the return air flow path upwardly with respect to the bottom edge of the sidewall assembly.

In yet another aspect, a method of assembling an aircraft is provided. The method includes coupling an inboard portion of a return air bridge to a bottom edge of a sidewall assembly and coupling an outboard portion of the return air bridge to a floor panel. The method also includes coupling a support member between the inboard portion and the outboard portion such that a return air flow path is defined between the inboard portion and the outboard portion. The outboard portion includes a plate configured to direct an air flow along the return air flow path upwardly with respect to the bottom edge of the sidewall assembly.

DETAILED DESCRIPTION

The implementations described herein relate to a sidewall assembly and return air bridge for use in an aircraft assembly. More specifically, the return air bridge includes an inboard portion configured to couple to the sidewall assembly at a bottom edge of the sidewall assembly and an outboard portion configured to couple to a structural member. The return air bridge also includes at least one support coupling the inboard portion to the outboard portion such that a return air flow path is defined between the inboard portion and the outboard portion. The outboard portion comprises a plate configured to direct an air flow along the return air flow path upwardly with respect to the bottom edge of the sidewall assembly.

The sidewall assembly and the return air bridge described herein combine to define for a discrete air return path that attenuates sound waves through a noise attenuation material and by angling the sound waves downward with respect to bottom edge of the sidewall assembly toward a carpet layer, which further mitigates the sounds waves before they reflect up into the cabin interior. Additionally, the sidewall assembly and the return air bridge define a torturous path that protects outboard portions of the sidewall assembly from ingesting foreign objects or admitting undesired passenger access from cabin interior. Such a tortuous path further attenuates noise transmitted into the cabin. Further, the combination of a film completely covering the openings in a decompression panel grille and the return air bridge defining a discrete noise attenuating air flow path, the herein described disclosure reduces the noise level transmitted to the cabin while defining a decompression flow path through the grille and a distinct return air path through the return air bridge.

Figure 1:
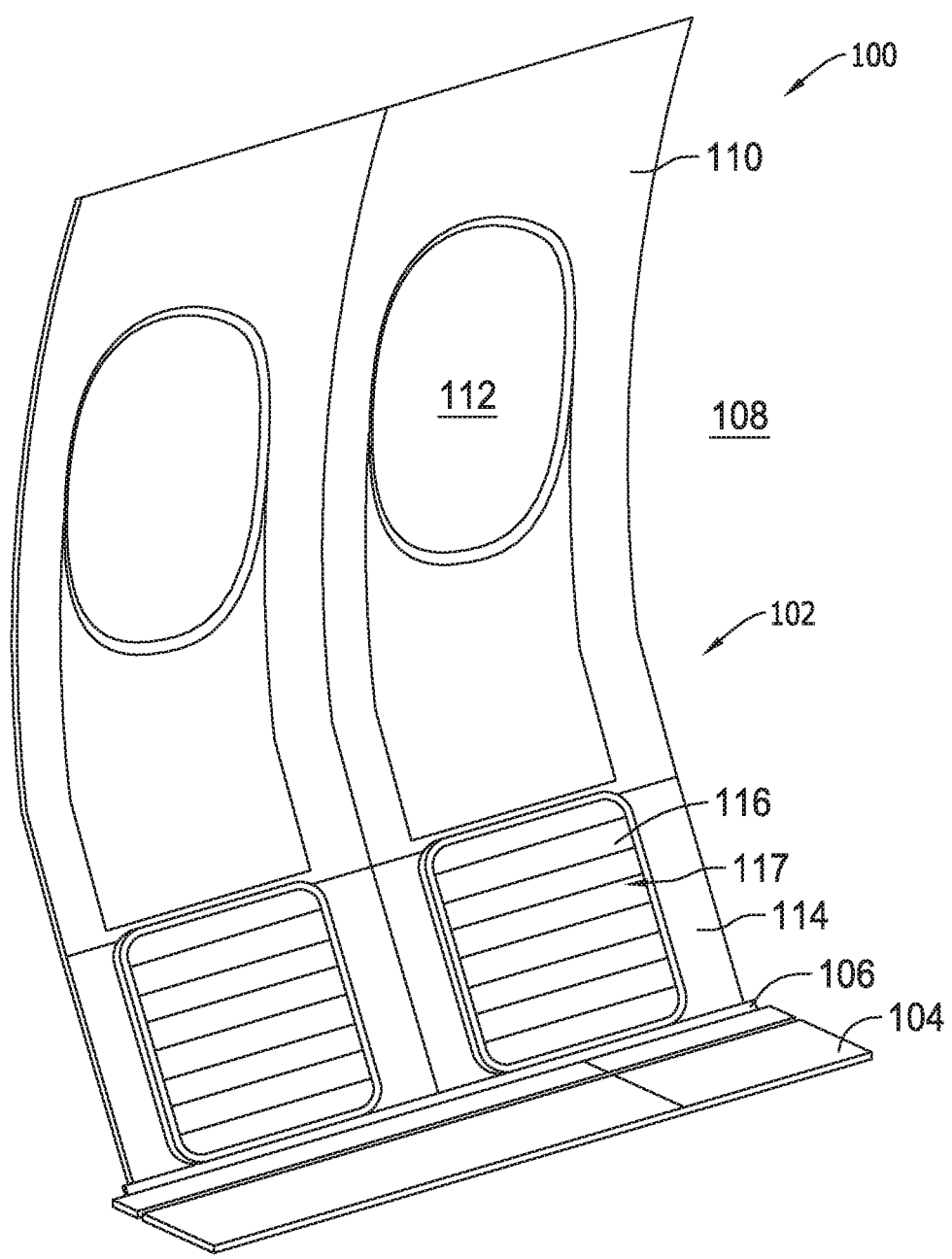
FIG. 1 is a perspective view of an inboard configuration of an exemplary aircraft cabin illustrating an exemplary sidewall assembly.
Figure 7:
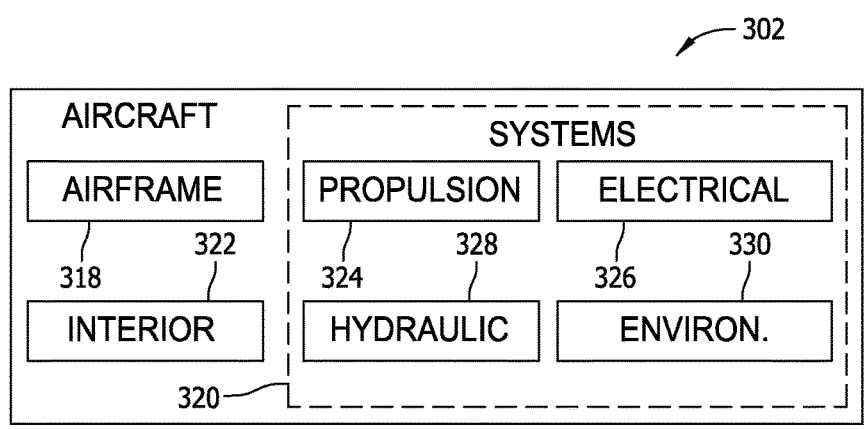
FIG. 7 is a block diagram of an exemplary aircraft.

Referring to the drawings, FIG. 1 is a perspective sectional view of an exemplary aircraft cabin 100 that may be used with an aircraft, such as an aircraft 302 (shown in FIG. 7). In the exemplary implementation, aircraft cabin 100 includes a sidewall assembly 102, a floor panel 104, and a return air bridge 106 coupled therebetween. Sidewall assembly 102, floor panel 104, and return air bridge 106 at least partially define an interior 108 of aircraft cabin 100. Sidewall assembly 102 includes a sidewall 110 having a window opening 112 defined therein. Sidewall assembly 102 also includes a decompression panel 114 coupled to and between both return air bridge 106 and sidewall 110. Decompression panel 114 includes a grill 116, having a plurality of louvers that define a plurality of openings 117, coupled to or defined in decompression panel 114. In operation, decompression panel 114 and return air bridge 106 facilitate circulating conditioned air through aircraft cabin 100 and/or facilitate equalizing the pressure in aircraft cabin 100 during a decompression event.

Figure 2:
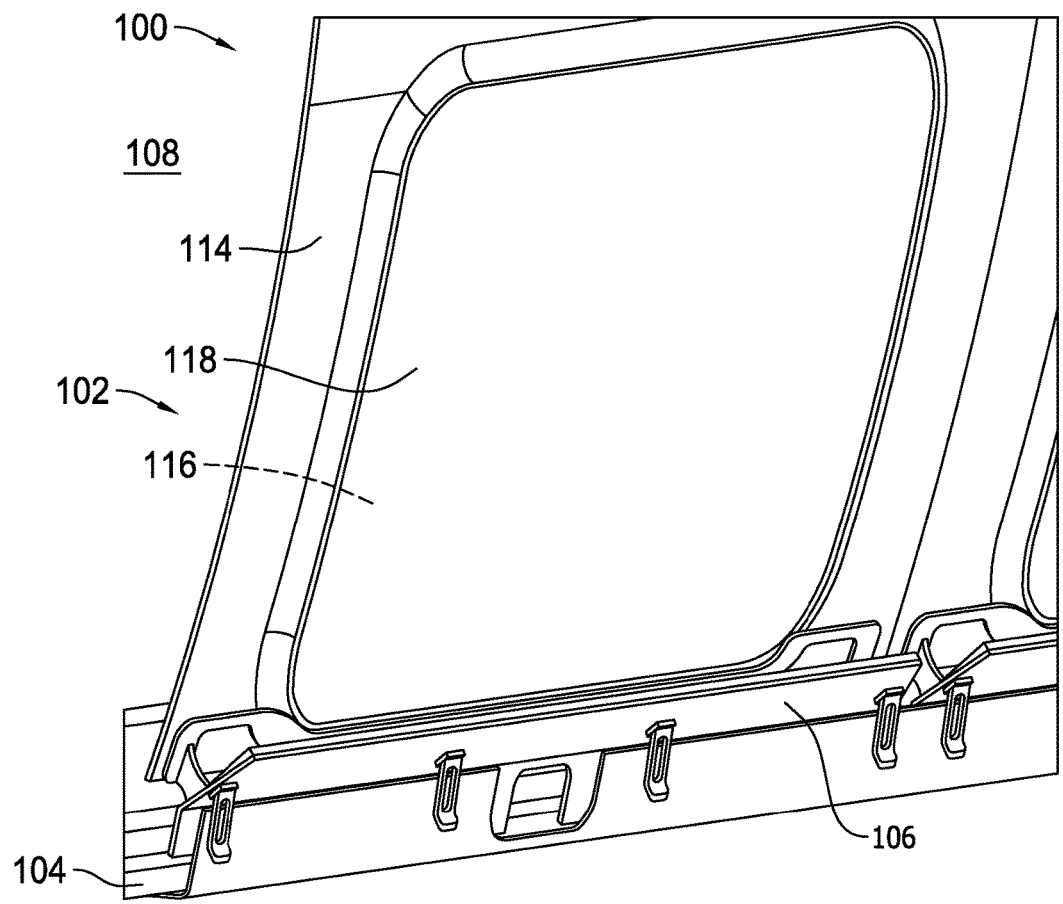
FIG. 2 is a perspective view of an outboard configuration of the aircraft cabin and sidewall assembly shown in FIG. 1.

FIG. 2 is a perspective view of an outboard configuration of aircraft cabin 100 and sidewall assembly 102. In the exemplary implementation, decompression panel 114 includes a baffle or film 118 releasably coupled to grille 116 such that film 118 covers an entirety of grille 116. Additionally, film 118 is formed from a noise attenuating material to decrease the noise level in cabin 100. During a decompression event, air flows through the openings 117 in grille 116 and detaches film 118 from grille 116 such that the air flows through decompression panel 114 without moving grille 116 relative to remainder of decompression panel 114 or moving decompression panel 114 relative to sidewall 110. During standard operation, film 118 completely covers the openings 117 in grille 116 to facilitate blocking sound generated in other parts of the aircraft from entering cabin 100 through grille 116.

Figure 3:
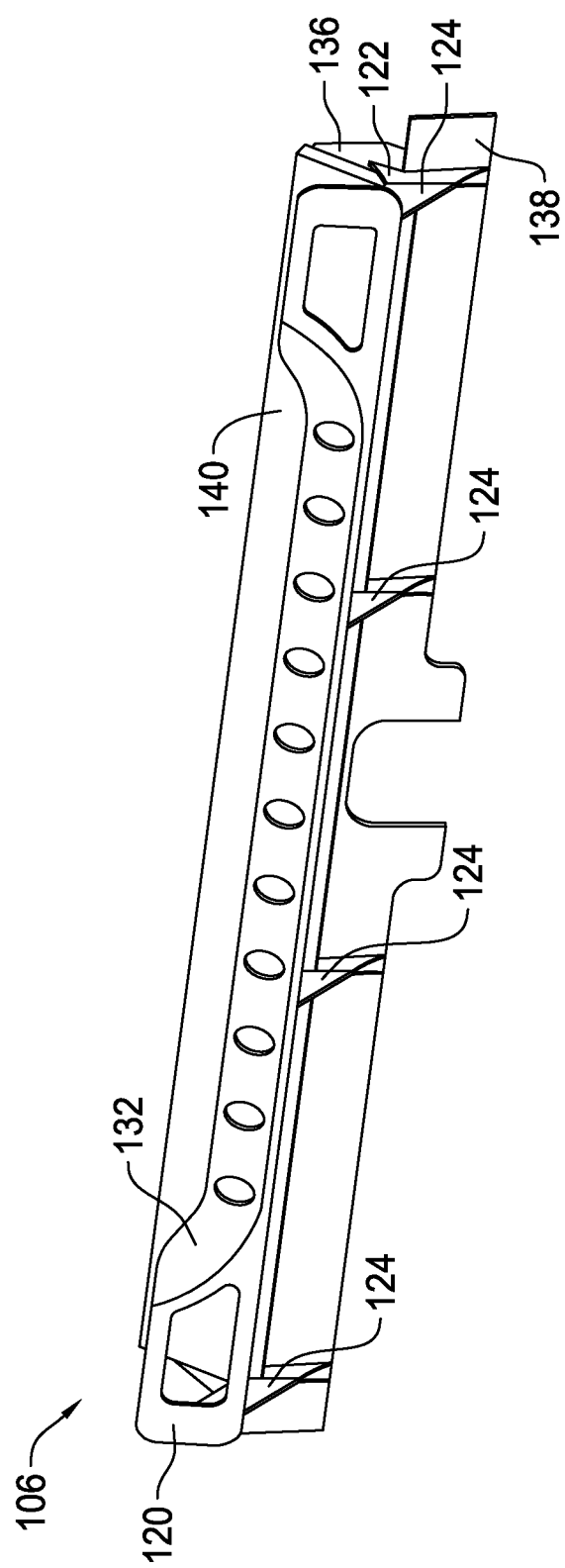
FIG. 3 is a perspective view of an exemplary return air bridge that is used with the sidewall assembly shown in FIGS. 1 and 2.
Figure 4:
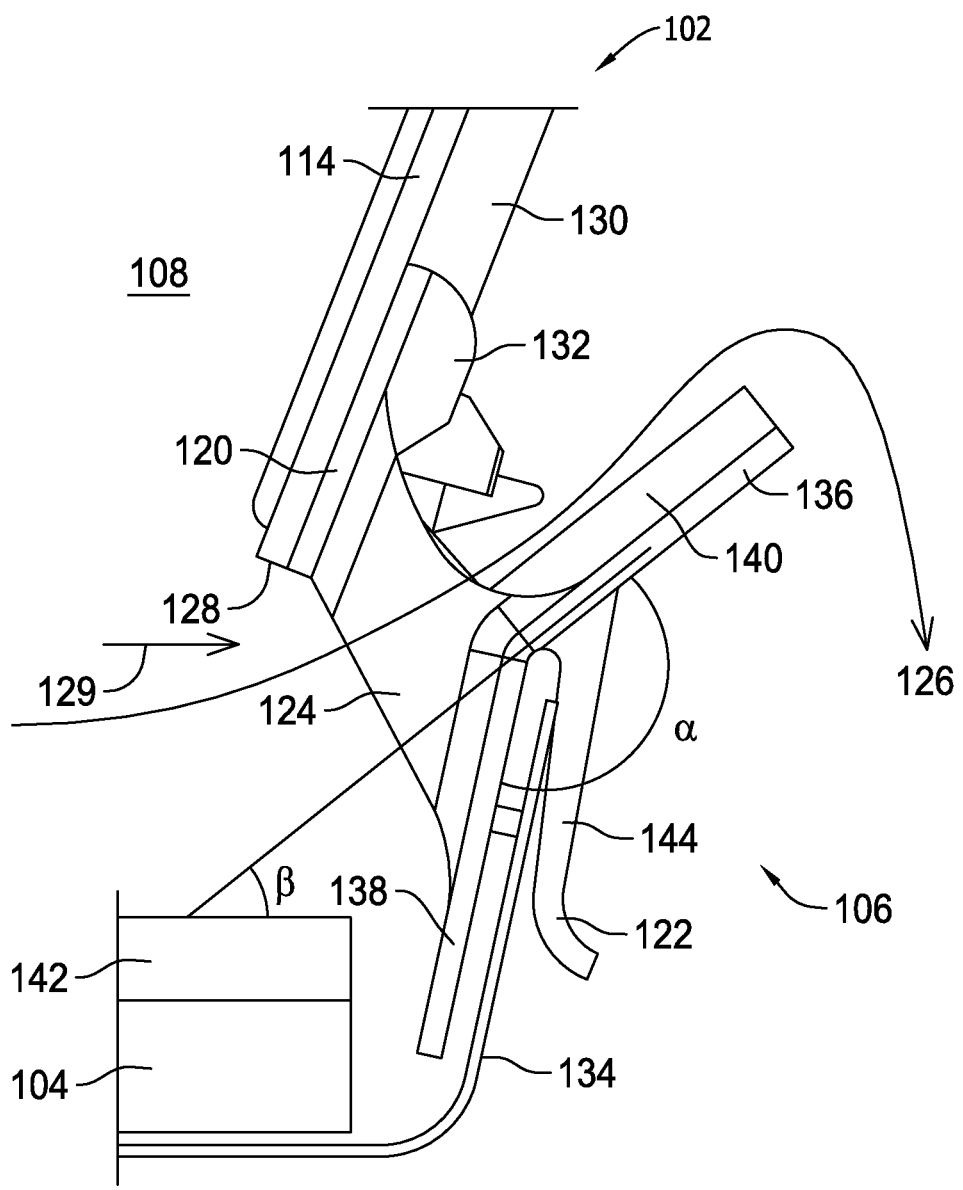
FIG. 4 is a side view of the return air bridge and sidewall assembly in the aircraft cabin.

FIG. 3 is a perspective view of return air bridge 106, and FIG. 4 is a side view of floor panel 104, return air bridge 106, and sidewall assembly 102 in aircraft cabin 100. In the exemplary implementation, return air bridge 106 includes an inboard portion 120, an outboard portion 122, and at least one support 124 coupled between inboard portion 120 and outboard portion 122 such that supports 124 space inboard portion 120 a distance from outboard portion 122 to define a return air flow path 126 between the inboard portion 120 and outboard portion 122. Return air path 126 facilitates channeling air from within cabin interior 108, between floor panel 104 and sidewall assembly 102, through return air bridge 106, and to an environmental control system (not shown) for processing. In one implementation, return air bridge 106 is integrally formed as one piece using a lightweight plastic. Alternatively, return air bridge 106 is formed from any number of pieces and/or any material that facilitates operation of return air bridge 106 as described herein.

In the exemplary implementation, inboard portion 120 is coupled to a bottom edge 128 of sidewall assembly 102 such that inboard portion 120 of return air bridge 106 spaces bottom edge 128 a distance from floor panel 104 to define a gap 129 between bottom edge 128 and floor panel 104. More specifically, bottom edge 128 of sidewall assembly 102 is defined by a bottom edge of one of decompression panel 114 or grille 116 such that inboard portion 120 is coupled to the bottom edge of one of decompression panel 114 or grille 116. In one implementation, decompression panel 114 includes a flange 130 to which at least one of grille 116 and film 118 is coupled. In such a configuration, inboard portion 120 of bridge 106 also includes a receiving portion 132 extending at least partially along a length of inboard portion 120 that is shaped correspondingly to flange 130 such that inboard portion 120 supports decompression panel 114 along bottom edge 128 and flange 130.

In the exemplary implementation, outboard portion 122 is coupled to a structural member, such as a portion of floor panel 104. More specifically, outboard portion 122 is coupled to a mop sill structure 134 coupled to and extending upwardly from floor panel 104. Outboard portion 122 includes a plate 136 and a flange 138 extending downwardly from plate 136 such that flange 138 is oriented at an oblique angle α with respect to plate 136. In the exemplary implementation, plate 136 at least partially defines flow path 126 and includes a noise attenuating material 140 coupled to plate 136 along return air flow path 126. In one implementation, material 140 includes an open cell melamine foam. Alternatively, material 140 includes any material that enables operation of return air bridge 106 as described herein. In the exemplary implementation, material 140 facilitates reducing noise propagation into cabin 100 through return air bridge 106 to predetermined levels within a speech impediment level guideline.

Plate 136 directs an air flow from within cabin interior 108 along return air flow path 126 upwardly with respect to bottom edge 128 of sidewall assembly 102. Additionally, plate 136 is oriented at a predetermined angle β with respect to floor panel 204 such that plate 136 directs at least a portion of sound waves not attenuated by material 140 toward floor panel 104. More specifically, floor panel 104 includes a layer of carpeting 142 coupled thereto that further attenuates the sound waves before they are reflect off carpet 142 and into cabin interior 108. In the exemplary implementation, plate 136 is oriented at an angle β within a range of approximately 30 degrees to 60 degrees with respect to floor panel 104. Alternatively, plate 136 is oriented at any angle that facilitates operation of return air bridge 106 as described herein.

In the exemplary embodiment, outboard portion 122 also includes an attachment mechanism 144 extending from plate 136 and coupled to mop sill structure 134 of floor panel 104. In one embodiment, mop sill structure 134 is coupled between attachment mechanism 144 and flange 138. In another embodiment, outboard portion 122 includes only plate 136 and attachment mechanism 144 that is coupled to mop sill structure 134. Attachment mechanism 144 includes at least one of a clip, a clamp, a threaded fastener, and a pin. Alternatively, attachment mechanism 144 includes any attachment means that facilitates operation of return air bridge 106 as described herein.

Figure 5:
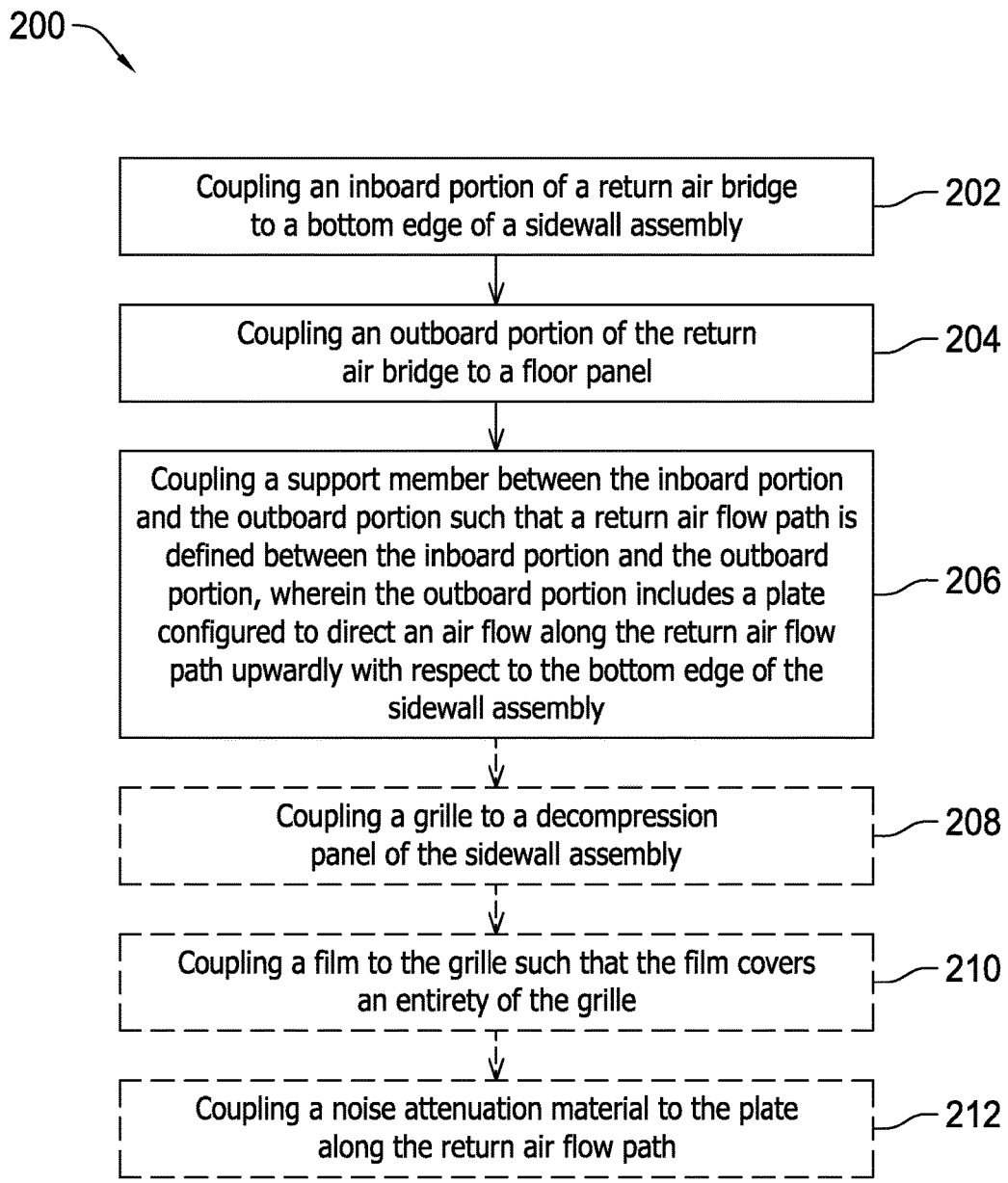
FIG. 5 is a flow chart of a method of assembling an aircraft using the sidewall assembly shown in FIGS. 1-4.

As shown in FIG. 5, a method 200 of assembling an aircraft is also provided. Referring to FIGS. 1-5, method 200 includes coupling 202 inboard portion 120 of return air bridge 106 to bottom edge 128 of sidewall assembly 102 and coupling 204 outboard portion 122 of return air bridge 106 to floor panel 104. Coupling 202 inboard portion 120 to bottom edge 128 of sidewall assembly 102 can include coupling inboard portion 120 to the bottom edge of decompression panel 114 of sidewall assembly 102. Coupling 204 outboard portion 122 of return air bridge 106 to floor panel 104 can include coupling an attachment mechanism 144 of outboard portion 122 to floor panel 104. Additionally, coupling 204 outboard portion 122 of return air bridge 106 to floor panel 104 can include coupling outboard portion 122 such that return air bridge 106 spaces bottom edge 128 of sidewall assembly 102 a distance from floor panel 104 to define gap 129 therebetween.

Method 200 also includes coupling 206 support member 124 between inboard portion 120 and outboard portion 122 such that return air flow path 226 is defined between inboard portion 120 and outboard portion 122. Method further includes coupling 208 grille 116 to decompression panel 114 or defining grille 116 in decompression panel 114. Film 118 is coupled 210 to grille 116 such that film 118 covers an entirety of grille 116 Moreover, method 200 also includes coupling 212 noise attenuation material 140 to plate 136 of outboard portion 122 along return air flow path 126.

Figure 6:
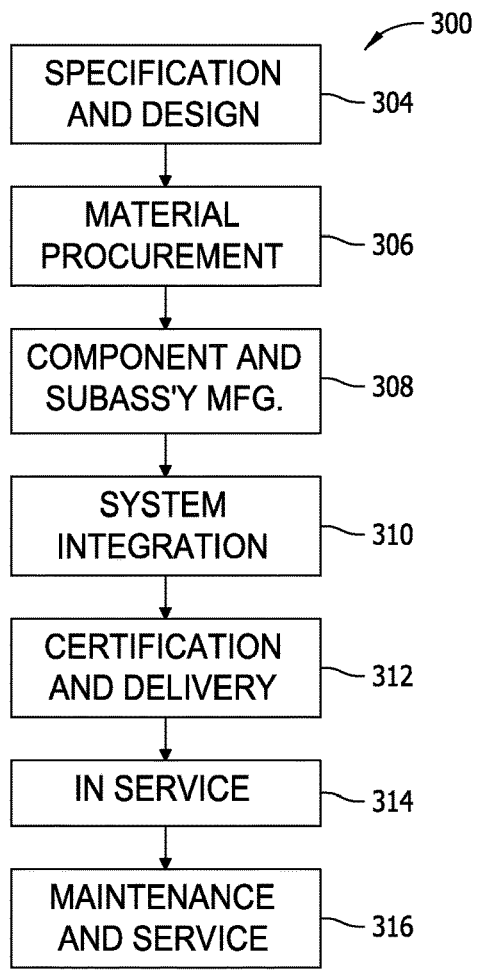
FIG. 6 is a flow diagram of an exemplary aircraft production and service methodology.

Implementations of the disclosure may be described in the context of an aircraft manufacturing and service method 300 (shown in FIG. 6) and via an aircraft 302 (shown in FIG. 7). During pre-production, including specification and design 304 data of aircraft 302 may be used during the manufacturing process and other materials associated with the airframe may be procured 306. During production, component and subassembly manufacturing 308 and system integration 310 of aircraft 302 occurs, prior to aircraft 302 entering its certification and delivery process 312. Method 200 (shown in FIG. 5) can be performed during manufacturing 308 and/or integration 310. Upon successful satisfaction and completion of airframe certification, aircraft 302 may be placed in service 314. While in service by a customer, aircraft 302 is scheduled for periodic, routine, and scheduled maintenance and service 316, including any modification, reconfiguration, and/or refurbishment, for example. At least some portions of method 200 can be performed during maintenance and/or service 316. In alternative implementations, manufacturing and service method 300 may be implemented via vehicles other than an aircraft.

Each portion and process associated with aircraft manufacturing and/or service 300 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, aircraft 302 produced via method 300 may include an airframe 318 having a plurality of systems 320 and an interior 322. Examples of high-level systems 320 include one or more of a propulsion system 324, an electrical system 326, a hydraulic system 328, and/or an environmental system 330. Any number of other systems may be included. Interior 322 is an example of interior 108 (shown in FIG. 1).

Apparatus and methods embodied herein may be employed during any one or more of the stages of method 300. For example, components or subassemblies corresponding to component production process 308 may be fabricated or manufactured in a manner similar to components or subassemblies produced while aircraft 302 is in service. Also, one or more apparatus implementations, method implementations, or a combination thereof may be utilized during the production stages 308 and 310, for example, by substantially expediting assembly of, and/or reducing the cost of assembly of aircraft 302. Similarly, one or more of apparatus implementations, method implementations, or a combination thereof may be utilized while aircraft 302 is being serviced or maintained, for example, during scheduled maintenance and service 316.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

The sidewall assembly and the return air bridge described herein facilitate at least one of 1) providing for a discrete air return path that attenuates sound waves through a noise attenuation material and by angling the sound waves downward with respect to bottom edge of the sidewall assembly toward a carpet layer, which further mitigates the sounds waves before they reflect up into the cabin interior, 2) defining a torturous path that protects outboard portions of the sidewall assembly from ingesting foreign objects or admitting undesired passenger access from cabin interior, 3) defining a return air flow path that is separate and/or isolated from a decompression flow path, and 4) allowing all openings defined through a decompression grille to be covered by a sound attenuating material to reduce sound waves from propagating through the openings into a passenger cabin.

Further, the combination of the film completely covering the openings in the grille and the return air bridge defining a discrete noise attenuating air flow path, the herein described disclosure reduces the noise level transmitted to the cabin while defining a decompression flow path through the grille and a distinct return air path through the return air bridge. Covering all of the openings can reduce the overall weight of the decompression panel because the sound attenuating material can be thinner than the material used when only a portion of the openings are covered. It should be understood that the herein-described return air bridge can be used with any suitable decompression panel or decompression grille.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A return air bridge for use in an aircraft assembly, said return air bridge comprising:
   an inboard portion configured to couple to a sidewall assembly at a bottom edge of the sidewall assembly;
   an outboard portion comprising a plate and an attachment mechanism extending from said plate and a flange extending from said plate proximate said attachment mechanism, said attachment mechanism positioned outboard of said inboard portion, and said attachment mechanism and said flange configured to couple to a structural member of an aircraft; and
   at least one support coupling said inboard portion to said outboard portion such that said inboard portion is horizontally offset from said outboard portion, wherein a return air flow path is defined between said inboard portion and said outboard portion, wherein said plate is configured to direct an air flow along the return air flow path upwardly with respect to the bottom edge of the sidewall assembly.

2. The return air bridge in accordance with claim 1, wherein said outboard portion further comprises a noise attenuating material coupled to an inboard side of said plate along the return air flow path.

3. The return air bridge in accordance with claim 1, wherein said attachment mechanism extends directly from said plate.

4. The return air bridge in accordance with claim 3, wherein said attachment mechanism comprises at least one of a clip, a clamp, a threaded fastener, or a pin.

5. The return air bridge in accordance with claim 3, wherein the structural member comprises a portion of a floor panel.

6. The return air bridge in accordance with claim 1, wherein the return air bridge spaces the bottom edge of the sidewall assembly a distance from the structural panel to define a gap therebetween.

7. The return air bridge in accordance with claim 1, wherein said flange is obliquely oriented with respect to said plate, wherein said flange is positioned inboard of said attachment mechanism.

8. The return air bridge in accordance with claim 7, wherein said flange extends from said plate such that said flange and said attachment mechanism define a gap therebetween configured to receive a portion of said structural member.

9. The return air bridge in accordance with claim 1, wherein said plate is oriented within a range of 30 degrees to 60 degrees with respect to the structural panel.

10. The return air bridge in accordance with claim 1, wherein at least a portion of said plate horizontally overlaps at least a portion of said inboard portion.

11. The return air bridge in accordance with claim 1, wherein said outboard portion is positioned entirely outboard from an innermost edge of said inboard portion.

12. An aircraft assembly comprising:
a floor panel comprising an upward extending portion;
a sidewall assembly comprising a bottom edge and a grill; and
a return air bridge coupled between said floor panel and said grill, said return air bridge comprising:
an inboard portion coupled to said bottom edge of said sidewall assembly;
an outboard portion coupled to said floor panel, said outboard portion comprising a plate, said plate having a flange and an attachment mechanism that define a gap therebetween configured to receive said upward extending portion; and
at least one support coupling said inboard portion to said outboard portion such that a return air flow path is defined between said inboard portion and said outboard portion, wherein said outboard portion comprises a plate configured to direct an air flow along the return air flow path upwardly with respect to the bottom edge of said sidewall assembly.

13. The assembly in accordance with claim 12, wherein said sidewall assembly comprises a sidewall and a decompression panel coupled between said sidewall and said return air bridge.

14. The assembly in accordance with claim 13, wherein a bottom edge of said decompression panel defines said bottom edge of said sidewall assembly.

15. The assembly in accordance with claim 13, wherein said decompression panel includes a film coupled to said grille such that said film covers an entirety of said grille.

16. A method of assembling an aircraft, said method comprising:
coupling an inboard portion of a return air bridge to a bottom edge of a sidewall assembly;
coupling an outboard portion of the return air bridge to a floor panel, wherein coupling the outboard portion comprises inserting a portion of the floor panel into a gap defined between a defined between a flange extending from a plate of the outboard portion and an attachment mechanism extending from the plate of the outboard portion; and
coupling a support member between the inboard portion and the outboard portion such that the inboard portion is horizontally offset from the outboard portion, wherein a return air flow path is defined between the inboard portion and the outboard portion, wherein the outboard portion includes a plate configured to direct an air flow along the return air flow path upwardly with respect to the bottom edge of the sidewall assembly.

17. The method in accordance with claim 16, wherein the sidewall assembly includes a decompression panel having a bottom edge, and wherein coupling the inboard portion comprises coupling the inboard portion to the bottom edge of the decompression panel of the sidewall assembly.

18. The method in accordance with claim 17, wherein the decompression panel includes a grille, the method further comprising coupling a film to the grille such that the film covers an entirety of the grille.

19. The method in accordance with claim 16, further comprising coupling a noise attenuation material to the plate along the return air flow path.

20. The method in accordance with claim 16, wherein the outboard portion includes an attachment mechanism, and wherein coupling the outboard portion comprises coupling the attachment mechanism of the outboard portion to the floor panel.

* * * * *

UNITED STATES PATENT AND TRADEMARK OFFICE
CERTIFICATE OF CORRECTION

PATENT NO. : 10,220,931 B2
APPLICATION NO. : 14/935788
DATED : March 5, 2019
INVENTOR(S) : Perkins et al.

Page 1 of 1

It is certified that error appears in the above-identified patent and that said Letters Patent is hereby corrected as shown below:

In the Claims

In Column 8, Line 22, Claim 16, delete "gap defined between a defined between a" and insert therefor -- gap defined between a --

Signed and Sealed this
Twenty-first Day of May, 2019

Andrei Iancu
*Director of the United States Patent and Trademark Office*